(12) United States Patent
Wu et al.

(10) Patent No.: US 12,399,412 B2
(45) Date of Patent: *Aug. 26, 2025

(54) MACH-ZEHNDER INTERFEROMETER DEVICE FOR WAVELENGTH LOCKING

(71) Applicant: Apple Inc., Cupertino, CA (US)

(72) Inventors: Yi-Kuei Wu, San Jose, CA (US); Jason Pelc, Sunnyvale, CA (US); Mark Alan Arbore, Los Altos, CA (US); Thomas C. Greening, San Jose, CA (US); Matthew A. Terrel, Campbell, CA (US); Yongming Tu, Redwood City, CA (US); Mohamed Mahmoud, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,269

(22) Filed: Dec. 1, 2023

(65) Prior Publication Data

US 2024/0094592 A1    Mar. 21, 2024

Related U.S. Application Data

(63) Continuation of application No. 17/015,974, filed on Sep. 9, 2020, now Pat. No. 11,835,836.

(Continued)

(51) Int. Cl.
*G02F 1/21*    (2006.01)
(52) U.S. Cl.
CPC ............... *G02F 1/21* (2013.01); *G02F 1/212* (2021.01)
(58) Field of Classification Search
CPC ...... G02B 27/10; G02B 27/0927; G02B 6/14; G02B 6/12; G02B 6/125; G02B 6/12007;
(Continued)

(56) References Cited

U.S. PATENT DOCUMENTS 6,487,336 B1    11/2002   Yao
7,333,690 B1     2/2008   Peale et al.
(Continued)

FOREIGN PATENT DOCUMENTS

CN     113218518     8/2021
JP     H04353804     2/1992
(Continued)

OTHER PUBLICATIONS

U.S. Appl. No. 18/519,035, filed Nov. 26, 2023, Bismuto et al.
(Continued)

*Primary Examiner* — Jie Lei
(74) *Attorney, Agent, or Firm* — Brownstein Hyatt Farber Schreck, LLP

(57) ABSTRACT

Disclosed herein is an integrated photonics device including an on-chip wavelength stability monitor. The wavelength stability monitor may include one or more interferometric components, such as Mach-Zehnder interferometers and can be configured to select among the output signals from the interferometric components for monitoring the wavelength emitted by a corresponding photonic component, such as a light source. The selection may be based on a slope of the output signal and in some examples may correspond to a working zone at or around a wavelength or wavelength range. In some examples, the interferometric components can be configured with different phase differences such that the corresponding working zones have different wavelengths. In some examples, the slopes of the output signals may be weighted based on the steepness of the slope and all of the output signals may include information for wavelength locking the measured wavelength to the target wavelength.

11 Claims, 7 Drawing Sheets

Related U.S. Application Data

(60) Provisional application No. 62/897,567, filed on Sep. 9, 2019.

(58) Field of Classification Search
CPC ........ G02B 6/42; G02B 6/4215; G02B 6/293; G02B 6/2935; G02B 6/2938; G02B 6/29301; G02B 6/29328; G02B 6/29395; G02B 6/29358; G02F 1/21; G02F 1/13; G02F 1/31; G02F 1/0121; G02F 1/225; G02F 1/313; G02F 1/365; G02F 1/212; G02F 2201/58; G02F 2001/212; G06N 10/00; G06N 20/00; G06E 3/00; G01J 1/42
USPC ... 359/577, 10, 11, 278, 279, 578, 579, 583; 385/1, 2, 8, 9
See application file for complete search history.

(56) References Cited

U.S. PATENT DOCUMENTS

| | | | |
|---|---|---|---|
| 7,555,220 | B2 | 6/2009 | Grubb et al. |
| 8,559,775 | B2 | 10/2013 | Babie et al. |
| 8,626,261 | B2 | 1/2014 | Ko et al. |
| 8,818,148 | B2 | 8/2014 | Boudreau et al. |
| 8,983,250 | B2 | 3/2015 | Black et al. |
| 9,020,004 | B2 | 4/2015 | Jeong |
| 9,110,259 | B1 | 8/2015 | Black |
| 9,348,154 | B2 | 5/2016 | Hayakawa |
| 9,620,931 | B2 | 4/2017 | Tanaka |
| 9,768,907 | B2 | 9/2017 | Hironishi |
| 9,835,881 | B2 | 12/2017 | Guzzon |
| 9,964,703 | B2 | 5/2018 | Parker et al. |
| 10,349,492 | B2 | 7/2019 | Sugiyama |
| 10,481,333 | B2 | 11/2019 | Soda |
| 10,534,189 | B2 | 1/2020 | Miller |
| 11,064,592 | B1 | 7/2021 | Bismuto et al. |
| 11,394,464 | B2 | 7/2022 | Nagarajan |
| 11,832,364 | B2 | 11/2023 | Bishop et al. |
| 11,835,836 | B1 * | 12/2023 | Wu .............. G02F 1/21 |
| 2007/0223552 | A1 | 9/2007 | Muendel et al. |
| 2008/0266639 | A1 | 10/2008 | Melloni et al. |
| 2014/0299743 | A1 * | 10/2014 | Miller .......... G02F 1/0136 |
| | | | 359/629 |
| 2014/0340690 | A1 | 11/2014 | Lefevre |
| 2023/0062578 | A1 | 3/2023 | Mahmoud et al. |
| 2023/0100317 | A1 | 3/2023 | Pelc et al. |

FOREIGN PATENT DOCUMENTS

| | | |
|---|---|---|
| JP | 2015068854 | 4/2015 |
| JP | 2015532848 | 11/2015 |
| JP | 2020112450 | 7/2020 |
| JP | 2020118887 | 8/2020 |
| WO | WO 14/129613 | 8/2014 |
| WO | WO 19/214244 | 11/2019 |
| WO | WO 20/039553 | 2/2020 |

OTHER PUBLICATIONS

Anonymous, "Multi mode Interferometer," Wikipedia, retrieved from https://en.wikipedia.org/w/index.php?title=Multi_mode_interferometer&oldid=1024100316, May 20, 2021, 2 pages.

Cai et al., "Analysis of the Coupling Characteristics of a Tapered Three-Guide Coupled System," *Journal of Lightwave Technology*, IEEE, USA, vol. 8, No. 10, Oct. 1, 1990, pp. 1621-1629.

He et al., "Integrated Polarization Compensator for WDM Waveguide Demultiplexers," *IEEE Photonics Technology Letters* vol. 11, No. 2, Feb. 1999, pp. 224-226.

Vance et al., "Design procedures for passive planar coupled waveguide devices," *IEE Proceedings: Optoelectronics, Institution of Electrical Engineers*, Stevenage, GB, vol. 141, No. 4, Aug. 1, 1994, pp. 231-241.

Yuanmin et al., "Analysis of the Coupling Characteristics of a Tapered Three-Guide Coupled System," *Journal of Lightwave Technology*, Oct. 1990, vol. 8, No. 10, pp. 1621-1629.

* cited by examiner

MACH-ZEHNDER INTERFEROMETER DEVICE FOR WAVELENGTH LOCKING

CROSS-REFERENCE TO RELATED APPLICATIONS

This application is a continuation of U.S. patent application Ser. No. 17/015,974, filed Sep. 9, 2020, which is a nonprovisional and claims the benefit under 35 U.S.C. 119(e) of U.S. Provisional Patent Application No. 62/897,567, filed Sep. 9, 2019, and entitled "Mach-Zehnder Interferometers (MZIS) Device for Wavelength Locking," the contents of which are incorporated herein by reference as if fully disclosed herein.

FIELD

This disclosure relates generally to systems and methods for wavelength monitoring. More particularly, this disclosure relates to a device having Mach-Zehnder interferometers (MZIs) for wavelength monitoring and the operation of the MZIs thereof.

BACKGROUND

Optical sensing systems can be useful for many applications. In some instances, it may be useful to measure the optical properties of light emitted by light sources included in the optical sensing systems. For example, the optical properties of emitted light can be monitored to ensure that a light source is tuned to a range of target wavelengths and/or has a certain amount of wavelength stability. Some of these types of monitors may not be suitable for certain applications due to factors such as size and complexity.

SUMMARY

Disclosed herein is a wavelength locking optical system. The wavelength locking optical system may include a first Mach-Zehnder interferometer (MZI) operable to output a first output signal with a first phase, a second MZI operable to output a second output signal with a second phase different from the first phase, a third MZI operable to output a third output signal with a third phase different from the first and second phases, and a controller configured to receive the first output signal, the second output signal, and the third output signal, compare, in a wavelength range, the first slope from the first output signal, a second slope from the second output signal, and a third slope from the third output signal, and select a largest slope of the first slope from the first output signal, the second slope from the second output signal, and the third slope from the third output signal to wavelength lock a measured wavelength of light to a target wavelength. In some examples, the wavelength locking optical system may include a light source configured to emit light, a first splitter configured to receive light from the light source and split the light into a first splitter light, a second splitter configured to receive first splitter light from the first splitter, split the first splitter light into a second splitter light, and pass the second splitter light to the third MZI, and a power monitor configured to receive the second splitter light from the second splitter and compare the measured wavelength of light with the target wavelength. In some examples, the controller is configured to weight the largest slope with a heaviest weight for use in wavelength locking the measured wavelength of light to the target wavelength. In some examples, the controller is configured to weight the first, second, and third slopes by assigning different weights depending on the steepness of the first, second, and third slopes and use the first, second, and third output signals to wavelength lock the measured wavelength of light to the target wavelength. In some examples, the wavelength locking optical system may include a detector configured to provide a first output detector signal, a second output detector signal, and a third output detector signal to the controller. In some examples, the wavelength locking optical system may include a light source configured to receive an adjustment signal from the controller.

In some examples, the first slope of the first MZI has a working zone in a first wavelength range, the second slope of the second MZI has a dead zone in the first wavelength range, and the working zone is used to wavelength lock the first wavelength range to a target wavelength range. In some examples, the wavelength locking optical system may include a first light source operable to emit a first wavelength and a second light source operable to emit a second wavelength, wherein the first and second wavelengths measure a same characteristic. In some examples, the wavelength locking optical system may include a one by two splitter operable to split light received from at least one of the first light source or the second light source and a power meter that receives light from the one by two splitter and is configured to lock on a linear portion of at least one of the first slope, the second slope, or the third slope. In some examples, the controller is configured to determine a power weighted average wavelength from the linear portion of at least one of the first slope, the second slope, or the third slope. In some examples, the controller provides an adjustment signal to at least one or both of the first light source or the second light source in order to shift a wavelength of the at least one of the first light source or the second light source, or both the first and second light sources, thereby achieving a target power weighted average wavelength.

Disclosed herein is a wavelength locking optical system. The wavelength locking optical system may include a first interferometric component operable to output a first output signal with a first phase, a second interferometric component operable to output a second output signal with a second phase different from the first phase, a third interferometric component operable to output a third output signal with a third phase different from the first and second phases, and a controller configured to determine a working zone from a first slope of the first output signal, a second slope of the second output signal, and a third slope of the output signal to wavelength lock a measured wavelength of light to a target wavelength. In some examples, the working zone includes a steepest slope of the first slope, the second slope, and the third slope. In some examples, the controller is configured to receive the first output signal, the second output signal, and the third output signal, weigh the first slope, the second slope, and the third slope, assign a heaviest weight to the largest slope of the first slope, the second slope, and the third slope and a lightest weight to a smallest slope of the first slope, the second slope, and the third slope, and use the first, second, and third output signals to wavelength lock the measured wavelength of light to the target wavelength. In some examples, the first interferometric component is a first MZI, the second interferometric component is a second MZI, and the third interferometric component is a third MZI, wherein at least two of the first MZI, second MZI, and third MZI have a 90 degree phase difference between the corresponding phases.

In some examples, the wavelength locking optical system may include a first light source operable to provide a first wavelength of light to at least one of the first, second or third interferometric components and a second light source operable to provide a second wavelength of light to at least one of the first, second or third interferometric components, wherein the first and second wavelengths of light measure a same characteristic. In some examples, the controller is configured to lock on a linear portion of at least one of the first slope, the second slope, or the third slope, determine a power weighted average wavelength using the linear portion of at least one of the first slope, the second slope, or the third slope, and provide an adjustment signal to at least one or both of the first light source, the second light source, to shift a wavelength to adjust the determined power weighted average wavelength to a target power weighted average wavelength.

Disclosed herein is a method for wavelength locking. The method may include measuring a first signal of an emitted light, using a first MZI, the first signal having a first phase, measuring a second signal of the emitted light, using a second MZI, the second signal having a second phase that is offset from the first phase, measuring a third signal of the emitted light, using a third MZI, the third signal having a third phase that is offset from the first phase and the second phase, comparing a first slope of the first signal at a measured wavelength of light, a second slope of the second signal at the measured wavelength of light, and a third slope of the third signal at the measured wavelength of light, and selecting a largest slope of the first slope, the second slope, and the third slope to wavelength lock the measured wavelength of light to a target wavelength. In some examples, the method may include weighting the first slope, the second slope, and the third slope, assigning weights to the first slope, second slope, and third slope based on a steepness of the first slope, second slope, and third slope, and using the weighted first slope, second slope, and third slope to wavelength lock the measured wavelength of light to the target wavelength.

In some examples, the measured wavelength of light has a first wavelength of light and measuring the third signal of the emitted light includes measuring a second wavelength of light, wherein the first and second wavelengths of light are less than two nanometers apart from each other. The method may include locking on a linear portion of one of the first slope, the second slope, or the third slope and determining a power weighted average wavelength from the linear portion of one of the first slope, the second slope, or the third slope. In some examples, the method may include shifting at least one of the first wavelength of light, the second wavelength of light, or both to achieve a target power weighted average wavelength.

In addition to the example aspects and embodiments described above, further aspects and embodiments will become apparent by reference to the drawings and by study of the following description.

BRIEF DESCRIPTION OF THE DRAWINGS

The use of the same or similar reference numerals in different figures indicates similar, related, or identical items.

Figure 1:
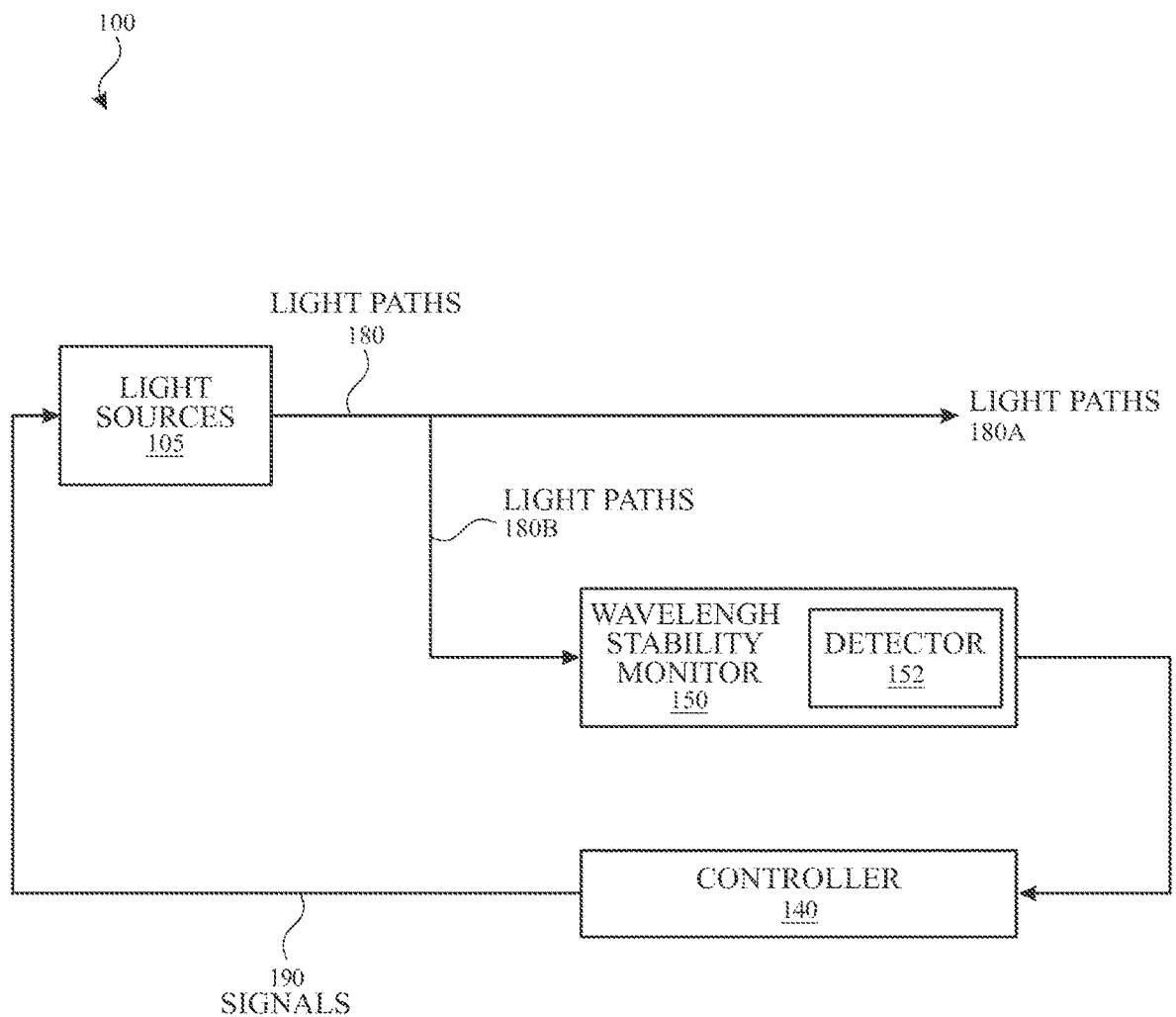
FIG. 1 illustrates a block diagram of a wavelength stability monitoring system.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Disclosed herein is an integrated photonics device including an on-chip wavelength stability monitor. The wavelength stability monitor can include multiple interferometric components, (e.g., such as Mach-Zehnder interferometers, distributed Bragg Reflector gratings, and so forth). The wavelength stability monitor can be configured to select among the output signals from the interferometric components for monitoring and/or wavelength locking the wavelength of the corresponding component such as one or more light sources. The selection can be such that the output signal corresponds to the working zone of an interferometric component at a given wavelength. In some examples, the working zone of a given interferometric component can be determined based on one or more properties of the output signal such as the slope of the output signal. In some examples, the interferometric components can be configured with different phase differences from one another. In some examples, the slope of the output signals may be weighted, where the largest slope may be weighted the heaviest and may be used to wavelength lock the measured wavelength to the target wavelength. In some examples, the slopes of all the interferometric components may be weighted depending on and in some cases according to the steepness of the corresponding slope, where the largest slope may be weighted the heaviest and the smallest slope may be weighted the lightest and all of the information from all of the interferometric components may be used for wavelength locking. In some examples, the slopes may be used to determine a power weighted average wavelength and the light sources may be adjusted to emit a different wavelength accordingly.

The use of the multiple output signals from the multiple interferometric components over the spectrum of interest can allow the wavelength stability monitor to be small in size, have lower complexity, and be able to accurately determine the difference between measured wavelength and target wavelength of the signal. This determined difference can be used for wavelength locking.

These and other embodiments are discussed below with reference to FIGS. 1-5. However, those skilled in the art will readily appreciate that the detailed description given herein with respect to these figures is for explanatory purposes only and should not be construed as limiting.

As used throughout this specification, a reference number without an alpha character following the reference number can refer to one or more of the corresponding references, the group of all references, or some of the references. For example, "325" can refer to any one of the splitters 325 (e.g., splitter 325A, splitter 325B, etc.), can refer to all of the splitters 325, or can refer to some of the splitters (e.g., both splitter 325A and splitter 325) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Device Overview

FIG. 1 illustrates a block diagram of a wavelength stability monitoring system. The wavelength stability monitoring system 100 may include light sources 105, a wavelength stability monitor 150, and a controller 140. In some examples, imaging and sensing applications are increasingly leveraging illumination from multiple wavelengths, thus it may be desirable to employ a wavelength monitor that can be used to monitor multiple different wavelengths. In some examples, the light sources may emit light along light paths 180A to another portion of the system, where the light may be used for its intended purpose (e.g., providing illumination for a sensing or imaging application). The wavelength stability monitor 150 may be used to detect light received from the light sources 105 using detector 152 and may direct the detected signal to the controller 140.

Generally, the wavelength stability monitoring system 100 may ensure that the light sources are emitting light with a target wavelength or wavelength range and/or that have a certain amount of wavelength stability. In some examples, properties of the light emitted by the light sources 105 may be monitored due to system variability which may be caused by power variations, current variations, thermal variations, deterioration of the light sources, and so forth. The light sources may emit light in which each light source may emit the same wavelength of light as one another or each light source may emit a different wavelength of light from one another so that collectively the light sources 105 may emit a wavelength of light or a wavelength range of light.

The light sources 105 may emit light that propagates along light path 180 and which may be split into two light paths 180A and 180B. The term "light path" may be used herein to describe the propagation of light from one optical element to another, and it may be understood that the light path may be within a waveguide or free space as appropriate for the example. In some examples, light propagating on light paths 180A may be directed to another portion of the system, where the light may be used for its intended purposes (e.g., providing illumination for a sensing or imaging application). Light propagating on light paths 180B may be directed to the wavelength stability monitor 150, where the light may be used for measuring and monitoring properties of the light.

The wavelength stability monitor 150 may receive light from the light sources 105 and along light paths 180B as input light. The wavelength stability monitor 150 may include detector 152 and may sense the input light using any type of detector, such as a diode that measures photons impinging on its active area. Although a single detector 152 is shown in FIG. 1, multiple detectors 152 may be employed. The detector(s) 152 may generate a detector signal indicative of properties of the input light and these detector signals also may be the output detector signals of the wavelength stability monitor 150 provided to the controller 140. Generally, the detector signals may be signals outputted by the detector(s) 152. In some examples, the detector(s) 152 may be part of the wavelength stability monitor 150 and, in other examples, the detector(s) 152 may not be part of the wavelength stability monitor 150 and, instead, may be part of the wavelength stability monitoring system 100 and coupled to the wavelength stability monitor 150. That is, in some examples, the detector(s) 152 may be integrated directly into the underlying photonics chip, while in other instances, the detector(s) 152 may be formed as a separate component and attached to the wavelength stability monitor 150.

The wavelength stability monitoring system 100 may include one or more additional components not illustrated in FIG. 1, such as, but not limited to, filters, amplifiers, analog-to-digital converters (ADCs), any combination thereof, and so forth, located between the wavelength stability monitor 150 and the controller 140. These additional components may use the signals from the wavelength stability monitor 150 for further signal processing, such as amplifying the signals, using the signals for comparisons or calculations, any combination thereof, and so forth. The wavelength stability monitoring system 100 may include any component or circuitry as appropriate to achieve the monitoring functionality as described herein.

In some examples, the stability monitor 150 and controller 140 may collectively determine the wavelength(s) currently being outputted by the light sources and generating control signals, however, this functionality can be split between the two in any suitable manner which will be discussed in further detail herein. In some examples, the signal generated by the wavelength stability monitor 150 may be used to control the light sources 105. That is, some of the functionality of the controller 140 may be included in the wavelength stability monitor 150. For example, the signal outputted from the wavelength stability monitor 150 may be indicative of properties that may cause variations in the light received from the light sources 105, such as thermal shifts, current shifts, power shifts, degradation of the light sources, and so forth.

The wavelength stability monitor 150 may provide the detector signals to the controller 140, which may be used as feedback in a control loop. The controller 140 may process the detector signals to determine a monitored wavelength(s) of the light sources 105. The controller 140 may additionally determine differences between the monitored wavelength(s) and a target wavelength of the light sources 105. In some examples, properties of the light emitted by the light sources 105 may be monitored due to system variability which may be caused by power variations, current variations, thermal variations, deterioration of the light sources, and so forth. The controller 140 may then use the difference between the monitored wavelength(s) and target wavelength(s) to generate an adjusted control signal 190 that may be transmitted to the light sources 105. Control signals may generally be signals that are outputted by the controller 140. In some examples, the adjusted control signal 190 may be the same control signal that was previously provided to the light sources 105 and, in other examples, the adjusted control signal 190 may be different than the previous control signal provided to the light sources 105. In some examples, there may be a signal path from the controller for each of the light sources 105, and the controllers may output a separate control signal for each light source that is active at any given moment. The adjusted control signal 190 may at least partially account for the system variabilities so that the light sources 105 may emit light with a wavelength closer to the target wavelength. In some examples, the controller may adjust its control signals 190 in response to determining these differences, and thus may act to maintain the output at or near a target wavelength.

In some examples, the wavelength stability monitor 150 may provide multiple output signals to the controller 140 (not illustrated in FIG. 1). The wavelength stability monitor 150 may include multiple on-chip detectors which may each generate a detector signal and the one or more detector signals may be transmitted to the controller 140 via one or more detection channels. In some examples, the multiple on-chip detectors may be discrete detectors or may be a detector array, or some combination thereof. In some examples, the wavelength stability monitor 150 also may include a primary output channel that may provide light to the another portion of the system. In the example that the monitored wavelength is the same as or approximately the same as the target wavelength, the detection channels may have zero or approximately zero values and the primary output channel may have a high level of output light. In the example where the monitored wavelength is different than the target wavelength, the detection channels may provide feedback to the controller 140 for adjusting the control signals for tuning the light sources 105.

The light sources may collectively emit wavelengths across a wide range of wavelength ranges, and thus it may be desirable to have the wavelength stability monitor to be able to lock for wavelengths across the range (e.g., so that the monitor may lock the wavelength of whichever light source is currently emitting light). In some examples, the wavelength stability monitoring system 100 may lock to a target wavelength of a wavelength range, which in some examples may be a broadband wavelength range. In some example embodiments, a "broadband wavelength range" may be generally a set of wavelengths over the approximate range of 1 μm. In some examples, the 1 μm emitted and/or detected broadband wavelengths may be in the "broadband" range of approximately 1.0 μm to 3.0 μm. Accordingly, embodiments described herein may operate over (e.g., lock to) an operating range that may correspond to, or be encompassed in, a broadband wavelength range. Examples of such operating ranges include 1.0 μm-2.0 μm, 1.3 μm-2.3 μm, 1.4 μm-2.4 μm, 1.5 μm-2.5 μm, and so forth. Although specific wavelength ranges may be discussed, any appropriate wavelength or wavelength range may be emitted and/or detected by the photonics elements described herein, depending on the use and construction of those elements.

The target wavelength may vary during device operation and, as the target wavelength varies over time, the wavelength stability monitoring system 100 may lock to the different target wavelengths accordingly. In some examples, a different target wavelength may be desired from a tunable laser or a different target wavelength may be desired by activation of a different light source of the light sources 105. In some examples, the wavelength stability monitoring system 100 may lock the monitored wavelength to a target ratio, such as the ratio of the detector signals from the detectors. Additionally, the target ratio may temporally vary. In some examples, the wavelength stability monitoring system 100 may not actively "measure" the wavelength, and instead may look at another metric (such as a ratio between detector signals).

In some examples, the wavelength stability monitoring system 100 can include multiple on-chip monitors and may output multiple signals to the controller 140. In some instances, each separate light source can be associated with a unique on-chip monitor such as the wavelength stability monitor 150. In some examples, different stability monitors may be associated with different light sources (or groups thereof). The signals can be directed along a primary output channel and detection channels. When the monitored wavelength matches the target wavelength, the primary output channel can have a maximum value, and the detection channels can have zero or close-to-zero values. When the monitored wavelength does not match the target wavelength, the signals from the detection channels can be used as feedback for adjusting the control signals to tune the light sources 105. For example, the adjacent detection channels can be used to determine a mismatch between the monitored wavelength and the target wavelength; such feedback can be used to adjust the pumping current of a light source.

Examples of the disclosure can include the wavelength stability monitoring system 100 locking to a target range of wavelengths (or frequencies). In some instances, the target wavelength may change during the wavelength stability monitoring system operation, and the wavelength stability monitoring system 100 can be configured for locking to different target wavelengths at different times. As used throughout this disclosure, wavelength (or frequency) locking refers to the wavelength stability monitoring system having the capability of accurately performing one or more of the following steps: measuring the wavelength (or frequency) of a signal from an optical component (e.g., a light output from a light source), determining the difference between the measured wavelength and a target wavelength, and adjusting a control signal to the optical component. In some examples, the control signal to the optical component can be used to reduce the difference between the measured wavelength and target wavelength. In some examples, the wavelength stability monitoring system can lock the monitored wavelength to a target ratio (which can be the ratio of the detector signals from the detectors). The target ratio may, in some examples, vary temporally.

Example Wavelength Monitor

Figure 2A:
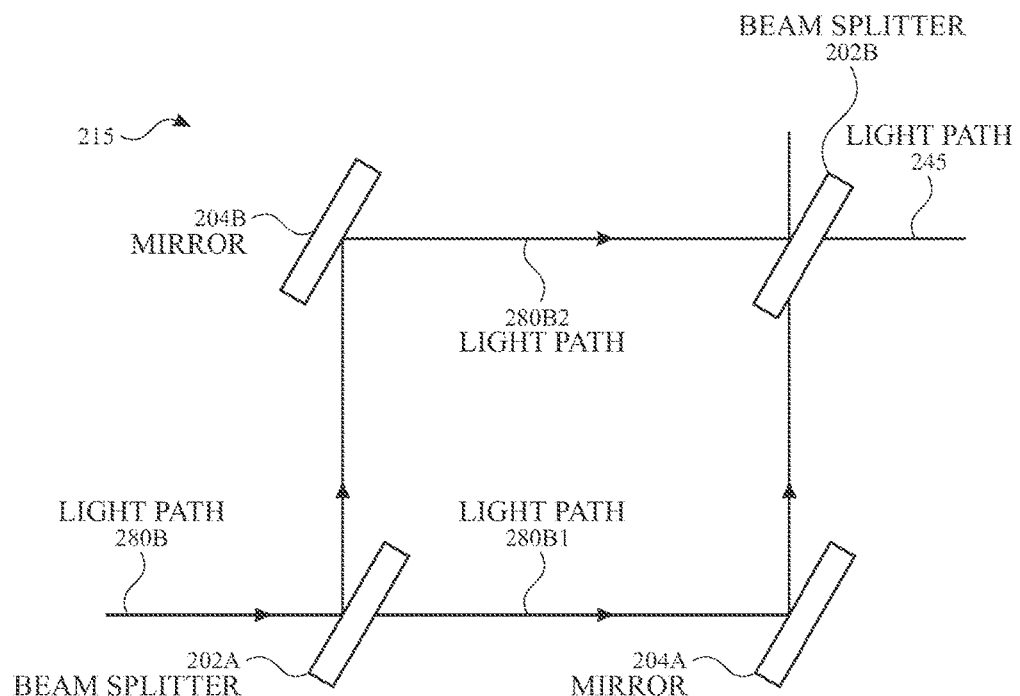
FIG. 2A illustrates a block diagram of an example MZI.

FIG. 2A illustrates a block diagram of an example MZI The MZI 215 may generally illustrate the principle of operation of an MZI, and may be implemented in a photonics platform as would be understood by a person of ordinary skill in the art. MZI 215 may include multiple beam splitters 202A and 202B and multiple mirrors 204A and 204B. The MZI 215 may receive an input light path 280B from the light source(s) 105 (shown in FIG. 1). It may be appreciated that input light path 280B is the input light paths 180B of FIG. 1 as similarly numbered elements may include similar functionality. The input light path 280B may be incident on the beam splitter 202A. The beam splitter 202A may be configured to split the light path 280B into two parts: light path 280B1 and light path 280B2. The light path 280B1 may be directed towards mirror 204A, and the light path 280B2 may be directed towards mirror 204B. Both mirror 204A and mirror 204B may direct the light path 280B1 and the light path 280B2, respectively, to the beam splitter 202B. The beam splitter 202B may combine the light path 280B1 and the light path 280B2 to form the recombined light path 245. In some examples, the signal path length (e.g., the path length of light path 280B1) may not be the same as the reference path length (e.g., the path length of light path 280B2).

In some applications, it may be desirable to lock the target frequency (or wavelength) to within a certain frequency, such as ±1 GHz. One way to lock the target frequency can be to use a frequency-dependent component, such as one or more MZIs. The MZIs can measure a change (e.g., deviation from target) in wavelength or frequency and can output a signal. The intensity of the output signal can be indicative of the change in wavelength (or frequency). In some examples, the MZIs can include a plurality of unbalanced MZIs, which may offer advantages such as high-resolution, relative to balanced MZIs, for example. In some examples, an unbalanced MZI can be one that has an imbalance between the signal path length and the reference path length. In some examples, an MZI may be used for wavelength locking in a particular portion of the signal, which will be described in further detail with reference to FIG. 2B. Additionally, multiple MZIs may be used for wavelength locking across the wavelengths of interest as will be described in further detail with reference to FIGS. 3A-5.

Figure 2B:
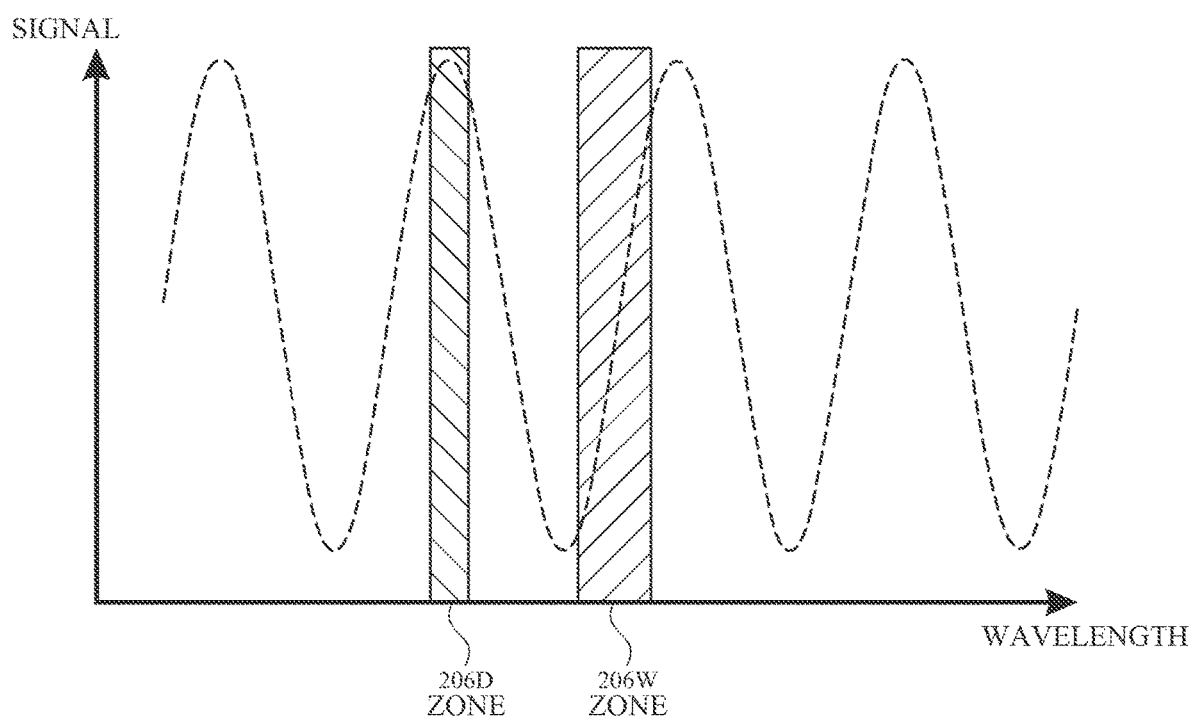
FIG. 2B illustrates an example signal output from an MZI as a function of wavelength.

FIG. 2B illustrates an example signal output from an MZI. The signal output illustrated in FIG. 2B is the recombined light path 245 in FIG. 2A, as a function of wavelength. As shown in FIG. 2B, the signal may exhibit a sinusoidal relationship between intensity and wavelength. The signal may include multiple zones with varying slopes, such as zone 206D and zone 206W. The zone 206D can be referred to as a "dead zone," which may be a wavelength range where the signal has a small slope (e.g., zero or close to zero) relative to other portions of the signal. In some examples, the MZI may have decreased or low sensitivity at or around the wavelengths in the zone 206D. Due to the low sensitivity, the MZI may not be able to discern between small differences between the target wavelength and the measured wavelength.

The zone 206W can be referred to as a "working zone," which may be a wavelength range where the signal has a relatively higher slope than the dead zone. For example, the slope of the signal in zone 206W may be greater than the slope of the signal in zone 206D. In some examples, the working zone may include the largest slope of all the output signals from the MZIs. In some examples, the MZI may have mid-sensitivity to high-sensitivity at or around the wavelengths in the zone 206W. Due to the mid/high sensitivity, the MZI may discern between small differences between the target wavelength and the measured wavelength. As such, the signal in the zone 206W may be used to accurately monitor the wavelength of light input into the MZI In some examples, the MZI may not accurately determine the difference between the measured wavelength from light path 280B of FIG. 2A and the target wavelength in the zone 206D. Additionally, the derivative of the signal taken in the zone 206D may not lead to useful information. For example, the wavelength stability monitoring system 100 may not be able to determine whether the measured wavelength is less than or greater than the target wavelength.

Figure 3A:
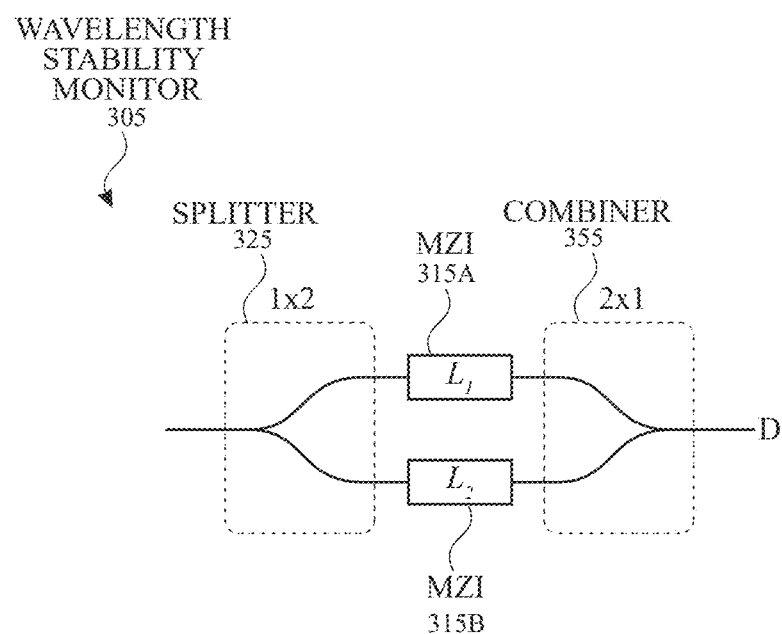
FIG. 3A illustrates a block diagram of an example wavelength monitor.

FIG. 3A illustrates a block diagram of an example wavelength monitor. In FIG. 3A, the wavelength stability monitor 305 includes a one by two splitter 325, a first MZI 315A, a second MZI 315B, and a two by one combiner 355. The wavelength stability monitor 305 is an example of wavelength locking using multiple MZIs. In FIG. 3A, light may be input into the one by two splitter 325. The one by two splitter 325 may split the incoming light and output the light onto two output light paths and may split the light approximately equally between the two outputs. The first output from the splitter 325 may be passed to the first MZI 315A and the second output from the splitter 325 may be passed to the second MZI 315B.

The first MZI 315A may provide a first output signal to the first input of the two by one combiner 355 and the second MZI may provide a second output signal to the second input of the two by one combiner 355. The two by one combiner 355 may combine the output signals and provide the combiner output to the detector or other elements of the wavelength stability monitor 305. The one by two splitter 325 and the two by one combiner 355 are used for explanatory purposes and the splitter may be a two by two splitter or any other appropriate splitter combination. Similarly, the two by one combiner 355 may be a two by two combiner and so forth. In some examples, the MZIs may include the one by two splitter and the two by one combiner. Additionally in some examples, the MZIs may be athermal or insensitive to temperature.

In FIG. 3A, the first MZI 315A may have a first arm length of L1 and the second MZI 315B may have a second arm length of L2. The first MZI 315A and the second MZI 315B may be different from each other by changing the relative lengths of one arm of the interferometer L1 versus the length of the other arm L2. By changing the relative lengths of one arm versus the other, the peaks and troughs of the first output signals from the first MZI 315A may not align the peaks and troughs of the second output signal from the second MZI 315B. In some examples, the phases of the output signals may be shifted by some fraction of a period, so long as the phase shifts are different from each other. Because the first output signal from the first MZI 315A is phase shifted from the second output signal from the second MZI 315B and the peaks and troughs of the first and second output signals do not align with one another, then one of the output signals may have a larger slope at a different wavelength than the other output signal. This may result in the increased likelihood of finding a large slope of an output signal with more relevant information than that which is provided by a smaller slope portion of the output signal.

Figure 3B:
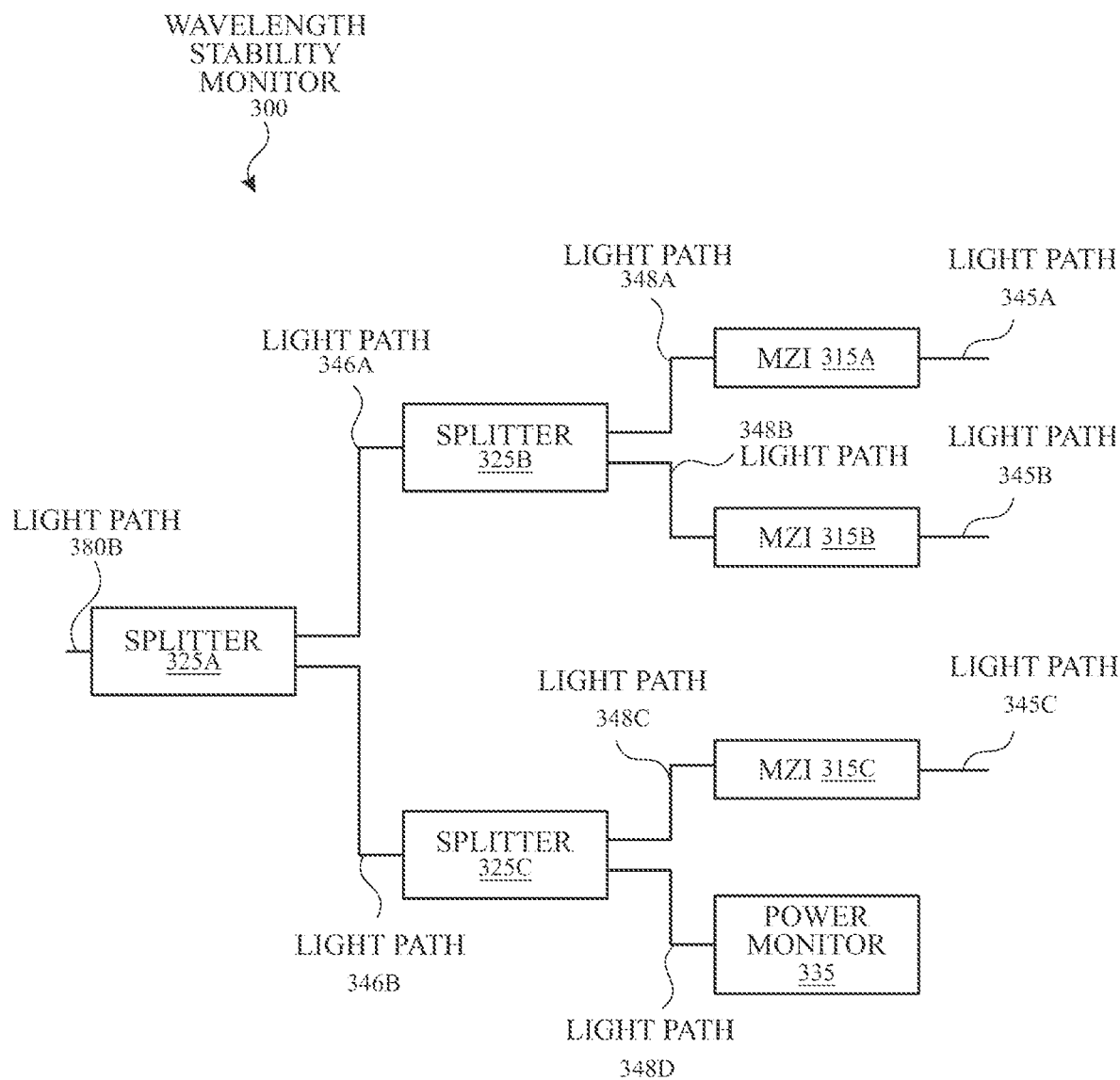
FIG. 3B illustrates a block diagram of another example wavelength monitor.

FIG. 3B illustrates a block diagram of an example wavelength monitor including multiple MZIs. The wavelength stability monitor 300 can include multiple MZIs 315, multiple splitters 325, and a power monitor 335. The splitters 325 can be configured to split an input light path (e.g., light path 380B) into multiple output light paths (e.g., light paths 346, 348).

In some examples, the wavelength stability monitor 300 may receive an input light path 380B from the light source(s) 105 (shown in FIG. 1). The light path 380B can be input to the splitter 325A. The splitter 325A can receive the light path 380B and can split it into multiple light paths 346A and 346B. In some examples, the light path 346A can be input to the splitter 325B, and the light path 346B can be input to the splitter 325C. In some examples, the splitters 325 may equally split the received light between the two output light paths. The splitter 325B can receive the light path 346A and can split it into multiple light paths 348A and 348B. The splitter 325C can receive the light path 346B and can split the received light into multiple light paths 348C and 348D. In some examples, the splitter 325A, the splitter 325B, and the splitter 325C can include one or more components and/or functions that are similar to one another. For example, each of these splitters can be a one by two splitter configured to split an input light path into two output light paths.

The wavelength stability monitor 300 can also include multiple MZIs. As illustrated in FIG. 3B, the wavelength stability monitor 300 includes MZI 315A, MZI 315B, and MZI 315C. In some examples, the MZI 315A can receive the light path 348A and can output the light path 345A. Similarly, the MZI 315B can receive the light path 348B and can output the light path 345B, and the MZI 315C can receive the light path 348C and can output the light path 345C. The light paths 345 output from the MZIs 315 can be input to one or more detectors (not shown in FIG. 3B).

In some examples, multiple MZIs can include one or more components, path lengths, and/or functions that are similar to one another with the exception of having different phases. In FIG. 3B, to achieve different phases, the MZIs may have different path lengths as described with reference to FIG. 3A. For example, the first MZI 315A can have a first phase, the second MZI 315B can have a second phase, and the third MZI 315C can have a third phase. In some examples, at least two MZIs may have phase shifts offset approximately 90 degrees from each other. In some examples, the 90 degree separation can be used to correct for drift due to waveguide dispersion.

Figure 4:
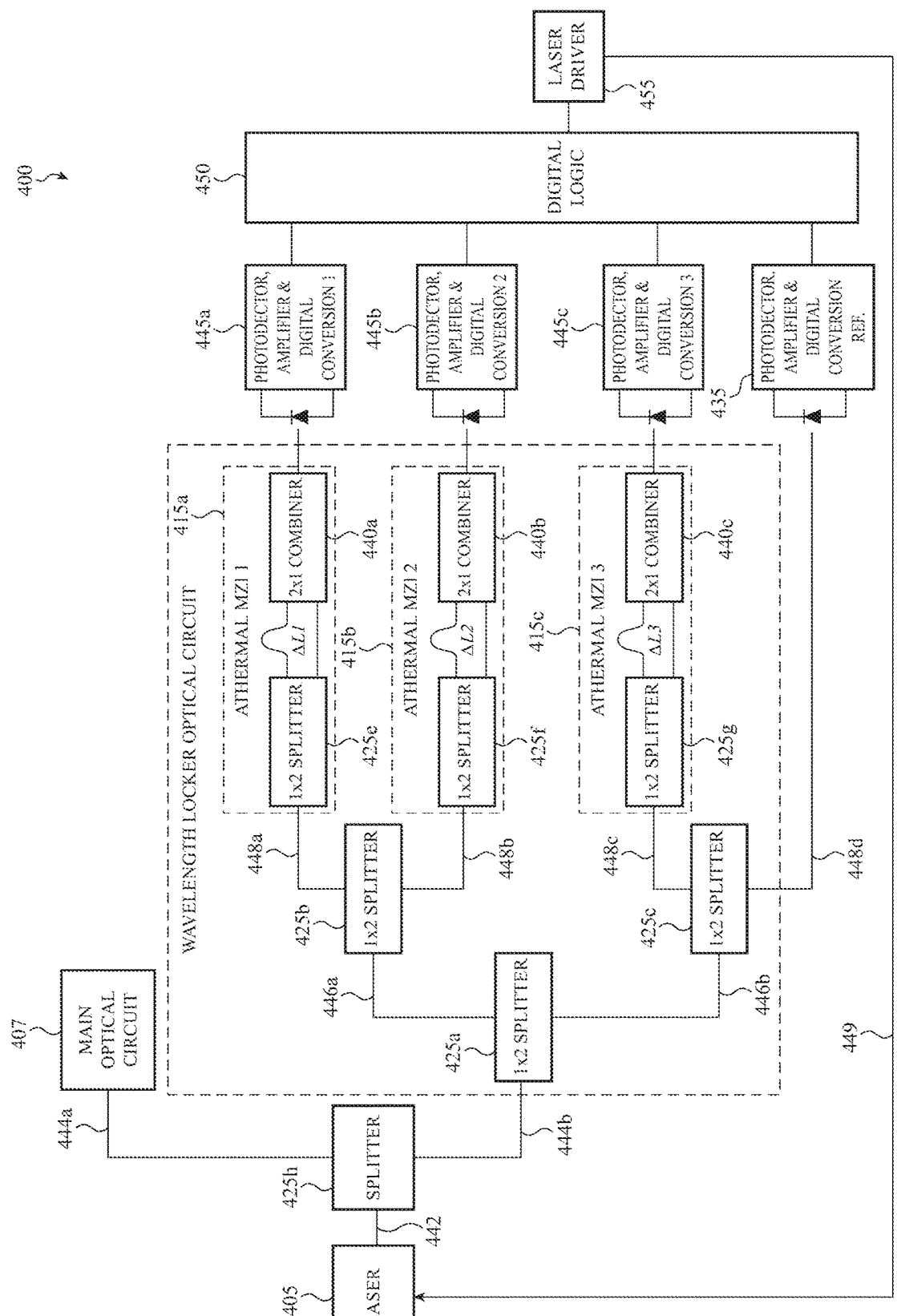
FIG. 4 illustrates a block diagram of another example wavelength monitor.

The wavelength stability monitor 300 may also include one or more detectors (not shown in FIG. 3B) coupled to the outputs of the MZIs 315, as discussed with respect to FIGS. 1 and 4. The detector(s) can be configured to measure the output light paths of the MZIs 315.

The wavelength stability monitor 300 may also include a power monitor 335. The power monitor 335 may receive the output light path from one of the splitters 325C along light path 348D and may compare the measured wavelength of light on the output light path with the target wavelength. The power monitor 335 can be configured to measure the signal intensity of the light, which may be indicative of the light input to each of the MZIs 315. In some examples, the power monitor 335 may be configured to determine the difference between a measured wavelength (or frequency) of an input light path and a target wavelength (or frequency).

In some examples, the signal intensity of light measured by the power monitor 335 can be used to correct for any changes in power in the light path 380B. Although FIG. 3B illustrates three splitters 325, any number of splitters may be used to realize the same or similar functionality. For example, the wavelength stability monitor 300 can include a single one by four splitter configured to split a single input light path into four output light paths. Similarly, although FIG. 3B illustrates three MZIs 315, examples of the disclosure can include any number of MZIs to realize the same or similar functionality. For example, the wavelength stability monitor 300 can include two MZIs, three MZIs, and so forth. In some examples, the number of MZIs can be related to the target spectral range, resolution, phase differences between MZIs, the slope of the MZI output signals, any combination thereof, and so forth. In some examples, four MZIs may be used for wavelength locking for a larger spectral range than that which three MZIs may be used. As another example, a greater number of MZIs can be used when the slope of the MZI output signals is higher or the frequency is increased.

In this manner, the wavelength stability monitor 300 may be configured for selecting among the output signals (e.g., light paths 345) of the multiple interferometric components (e.g., MZIs 315), where the selected signal at a given wavelength corresponds at or around the working zone of the interferometric component. In some examples, light path 345A of the first MZI 315A can be selected at a first working zone, light path 345B of the second MZI 315B can be selected at a second working zone, and light path 345C of the third MZI 315C can be selected at a third working zone. In some examples, the wavelength stability monitor 300 can rotate between the selected signals. For example, the wavelength stability monitor 300 can select different MZIs based on the corresponding working zone, such as first MZI 315A for the first working zone, second MZI 315B for the second working zone, third MZI 315C for the third working zone, first MZI 315A for the fourth working zone, second MZI 315B for the fifth working zone, third MZI 315C for the sixth working zone, and so forth. In some instances, the first, second, and third working zones can be in a given order and collectively monitor the spectrum or wavelength range of interest.

Although the disclosure discusses MZIs in particular, examples of the disclosure can use other types of interferometric components that each exhibit an output signal having a slope that varies with wavelength (or frequency). An example interferometric component can include, but is not limited to, one or more distributed Bragg Reflector (DBR) gratings.

Figure 3C:
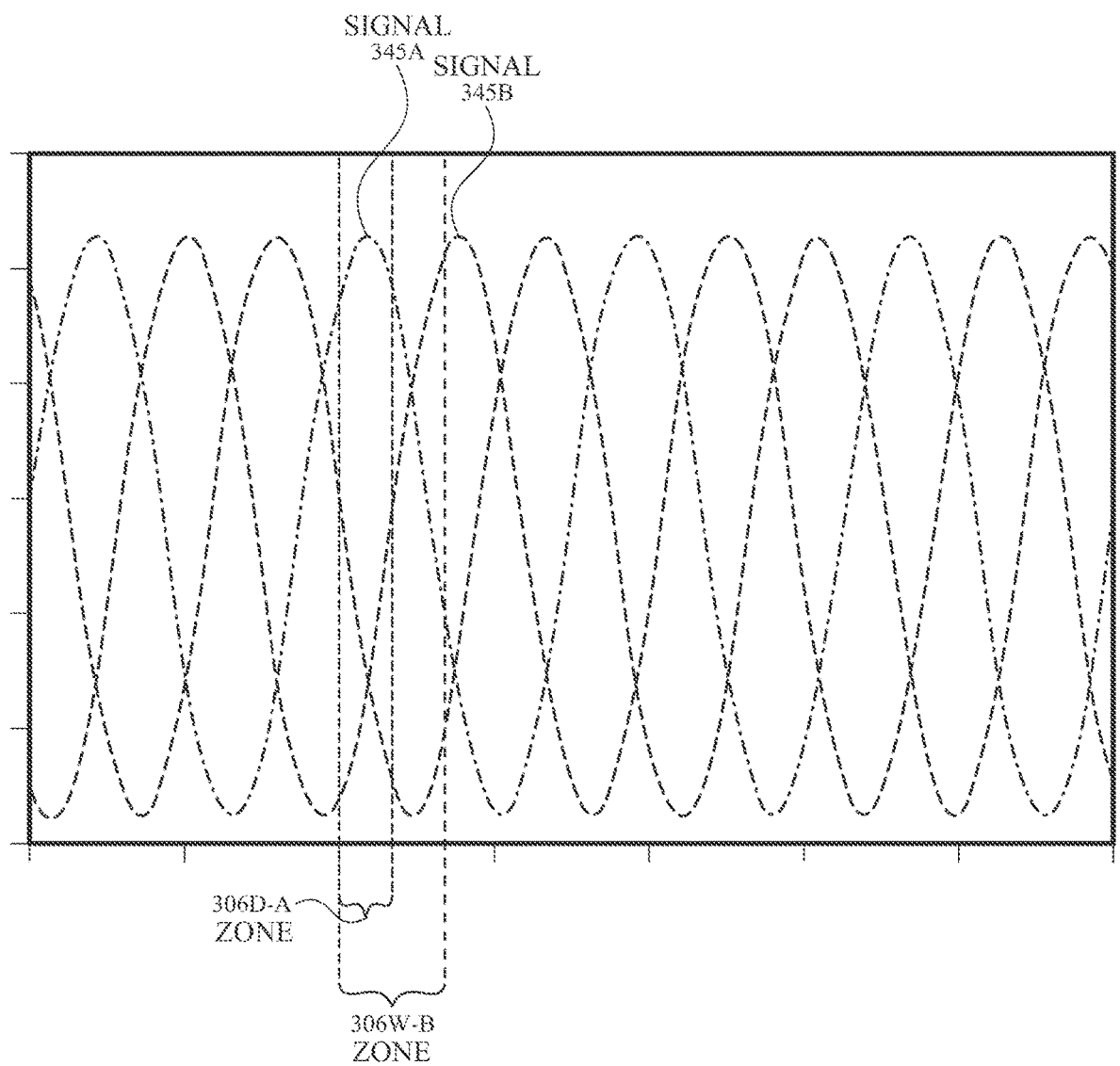
FIG. 3C illustrates example signal outputs as a function of frequency from multiple MZIs included in a wavelength stability monitor.

FIG. 3C illustrates example signal outputs as a function of frequency from multiple MZIs included in a wavelength stability monitor. Each MZI may output a signal that has a sinusoidal relationship between intensity and wavelength. The signal from each MZI may have multiple zones 306D and 306W. In some examples, the zones of at least one (e.g., all) MZIs may be located at a different wavelength relative to the other MZIs. In this manner, each wavelength may correspond with a working zone 306W of at least one MZI. In some examples, the working frequency zone of one interferometric component, such as a first MZI, may be located at least partially with a dead frequency zone of another interferometric component, such as a second MZI. At least some of the MZIs (or in some cases all of the MZIs) can be used together so that the relative wavelength difference can be accurately monitored over the entire frequency spectrum of interest or wavelength range of interest.

For example, as shown in FIG. 3C, signal 345A can be a signal output from a detector coupled to light path 345A of MZI 315A of FIG. 3B. Signal 345B can be a signal output from a detector coupled to light path 345B of MZI 315B of FIG. 3B. In some examples, the signal 345A may not include useful information in its dead zone 306D-A for purposes of wavelength monitoring. In order to monitor the wavelength where zone 306D-A is located, the wavelength stability monitor 300 may be configured to use a different MZI, such as MZI 315B. The signal 345B may have a working zone 306W-B at one or more overlapping wavelengths as the zone 306D-A. Since the working zone 306W-B may include useful information for purposes of wavelength monitoring, the wavelength stability monitor 300 may switch to using information from signal 345B (rather than information from signal 345A) at wavelengths other than those in the dead zone 306D-A. In some examples, different MZIs may be used for monitoring the wavelength. For example, in a first wavelength range, a first MZI can be used, in a second wavelength range, a second MZI can be used, in a third wavelength range, a third MZI can be used, and so forth.

FIG. 4 illustrates a block diagram of an example wavelength monitor. In FIG. 4, the wavelength stability monitor 400 includes a light source 405, one by two splitters 425, a main optical circuit 407, a first MZI 415A, a second MZI 415B, a third MZI 415C, photodetectors 445, digital logic 450, and a laser driver 455. The wavelength stability monitor 400 is an example of wavelength locking using multiple MZIs. The MZIs 415 of FIG. 4 may have phase shifts relative to each other to wavelength lock the measured wavelength to a target wavelength as discussed in further detail herein. In some examples, the target wavelength may be the wavelength of light used to measure a specific properties or may be a small range of wavelengths of light used to measure a specific property. In some examples, the MZIs 415 may be configured to determine the difference between a measured wavelength of an input light path and a target wavelength. The splitters 425 can be configured to split an input light path (e.g., light path 446) into multiple output light paths (e.g., light paths 448).

In FIG. 4, light from the light source 405 may emit light as input light along light path 442 into the one by two splitter 425H. The one by two splitter 425H may split the incoming light and output the light onto two output light paths 444A and 444B and may split the light approximately equally between the two outputs. The first output from the splitter 425H may be passed to the main optical circuit 407 and the second output from the splitter 425H may be passed to the one by two splitter 425A of the wavelength locker optical circuit. In some examples, the light source 405 may be one or more lasers such as a laser, laser diode, VCSEL, edge-emitting laser, any coherent light source, any semi-coherent light source, and so forth. In some examples, the one by two splitter 425H may be a splitter that does not split the light equally between the outputs and may instead tap the light between light paths 444A and 444B asymmetrically.

The one by two splitter 425A may receive the light from the one by two splitter 425H. The one by two splitter 425A may split the incoming light and output the light onto two output light paths 446A and 446B. The one by two splitter 425B may receive light from the one by two splitter 425A along light path 446A and the one by two splitter 425C may receive light from the one by two splitter 425A along light path 446B. Each of the one by two splitters 425B and 425C may split the light approximately equally between the respective outputs. The one by two splitter 425B may provide light along light path 448A to MZI 415A and along light path 448B to MZI 415B. Similarly, the one by two splitter 425C may provide light along light path 448C to MZI 415C and along light path 448D to photodetector 435.

In some examples, the MZIs 415 may include one by two splitters 425 and two by one combiners 440. Further, MZI 415A may include one by two splitter 425E and two by one combiner 440A. Similarly, MZI 415B may include one by two splitter 425F and two by one combiner 440B and MZI 415C may include one by two splitter 425G and two by one combiner 440C. The one by two splitters 425 of FIG. 4 and the two by one combiners 440 are used for explanatory purposes and the splitter may be a two by two splitter, a one by three splitter, or any other appropriate splitter combination. Similarly, the two by one combiner 440 may be a two by two combiner and so forth.

In some examples, the multiple MZIs 415 can include one or more components, path lengths, and/or functions that are similar to one another with the exception of having different phases. In FIG. 4, to achieve different phases, the MZIs 415 may have different path lengths as described with reference to FIG. 3A. For example, the first MZI 415A can have a first phase, the second MZI 415B can have a second phase, and the third MZI 415C can have a third phase, where the second phase is different from the first phase and the third phase is different from the first phase and second phase. In some examples, at least two MZIs may have phase shifts offset approximately 90 degrees from each other.

In FIG. 4, the first MZI 415A and the second MZI 415B may be different from each other by changing the relative lengths of one arm of the interferometer versus the other. In some examples, the phases of the output signals may be shifted by some fraction of a period, so long as the phase shifts are different from each other. Because the first output signal from the first MZI 415A is phase shifted from the second output signal from the second MZI 415B, and the peaks and troughs of the first and second output signals do not align with one another, then one of the output signals may have a larger slope at a different wavelength than the other output signal.

In some examples, the largest slope may be selected from the MZIs by the digital logic of controller 450 and may be used to wavelength lock a measured wavelength of the light to a target wavelength. The controller 450 may compare the first, second, and third slopes from the respective MZIs and select the largest slope. The largest slope may be indicative of the MZI being sensitive at the corresponding wavelength or range of wavelengths to the linear part of the slope. In some examples, the slope may be a wavelength dependent slope. The largest slope may be further indicative of including more relevant information than the flatter parts or lower slopes of the signals. The output signals from the MZIs may be generally sinusoidal, but out of phase with one another. In some examples, at least one of the slopes of the MZIs may be weighted and the largest slope may be given the heaviest weight. Additionally, the largest slope may be used to wavelength lock the measured wavelength of light to the target wavelength. Further, one or more wavelengths of light may be used when using the largest slope for wavelength locking.

In some examples, all of the slopes of the MZI output signals may be weighted using the digital logic or controller 450, depending on (and in some examples, according to) the steepness of the slope. In some examples, the largest slope may be assigned or given the heaviest weight and the smallest slope may be assigned or given the lightest weight. In some examples, the steepness of the slope may be provided by taking the derivative of the curve, where the highest derivative is the steepest slope and assigned the heaviest weight and the lowest derivative is the least steep slope and assigned the lightest weight. Even though the output signals may contain more or less information, all three of the MZI output signals may be used for wavelength locking and may contribute relevant information. By using one or more of the output signals of the MZIs, the sensitivity of the wavelength stability monitor may be increased by a factor of approximately one to three. In some examples, it may be possible to increase the frequency to increase the sensitivity of the wavelength stability monitor, so long as the corresponding periods of the MZIs is consistent. Additionally, one or more wavelengths of light may be used when using the largest slope for wavelength locking.

In some examples, two light sources such as lasers may simultaneously provide light to the MZIs. By locking onto the linear part of the slope or the portion of the output signal with the largest slope using the digital logic or controller 450, the power weighted average wavelength may be determined. Once the power weighted average wavelength is determined, then either one of the light sources or both the light sources may be adjusted based on the power weighted average wavelength. In some examples, there may be two lasers capable of emitting at or near the same wavelength, which may allow for the system to increase the emission at that wavelength and/or provide a backup in case one of the lasers fails. Assuming the system allows for some minor deviations in wavelength for its intended purpose (e.g., for measurements or imaging), then it may not be necessary to separately monitor the wavelengths. Instead, we can use the power weighted average and other methods to facilitate control. In some examples, this may be achieved with one MZI or two or more MZIs. Although the light sources may be adjusted, there may be a maximum limit by which the wavelength of the light sources may be separated from one another. Depending on these system/use constraints, it may be desirable to verify that the two wavelengths are not separated by more than a threshold amount. In some examples, the wavelengths of the two light sources may be either the same or less than two nanometers apart from one another so that the wavelengths of light may measure the same characteristic. The wavelengths of light may provide the same type of information from the measurement. In some examples, a wavelength or range of wavelengths may arise where the output signal may not be linear. In this circumstance, a maximum error may be calculated, which may improve the approximation and bring the output signal closer to linear.

In some examples, the light source 405 may include two lasers that emit wavelengths of light spaced apart from each other by less than two nanometers so that the light may behave as one wavelength spectroscopically. Because the wavelengths are close enough to one another, the light sources may provide more power and have the flexibility to be controlled together.

The wavelength stability monitor 400 may also include one or more detectors 445 coupled to the outputs of the MZIs 415. The detector(s) can be configured to measure the output light paths of the MZIs 415. In some examples, the detectors may include the functionality of an amplifier and digital conversion.

The wavelength stability monitor 400 may also include a detector 435 that includes a power monitor. The power monitor can be configured to measure the signal intensity of the light, which may be indicative of the light input to each of the MZIs 315. In some examples, the signal intensity of light measured by the power monitor can be used to correct for any changes in power in the light path 380B. Although FIG. 3B illustrates three splitters 325, any number of splitters may be used to realize the same or similar functionality. For example, the wavelength stability monitor 300 can include a single one by four splitter configured to split a single input light path into four output light paths. Similarly, although FIG. 3B illustrates three MZIs 315, examples of the disclosure can include any number of MZIs to realize the same or similar functionality. For example, the wavelength stability monitor 300 can include two MZIs, three MZIs, and so forth. In some examples, the number of MZIs can be related to the target spectral range, resolution, phase differences between MZIs, the slope of the MZI output signals, any combination thereof and so forth. In some examples, four MZIs may be used for wavelength locking for a larger spectral range than that which three MZIs may be used. As another example, a greater number of MZIs can be used when the slope of the MZI output signals is higher or the frequency is increased.

Figure 5:
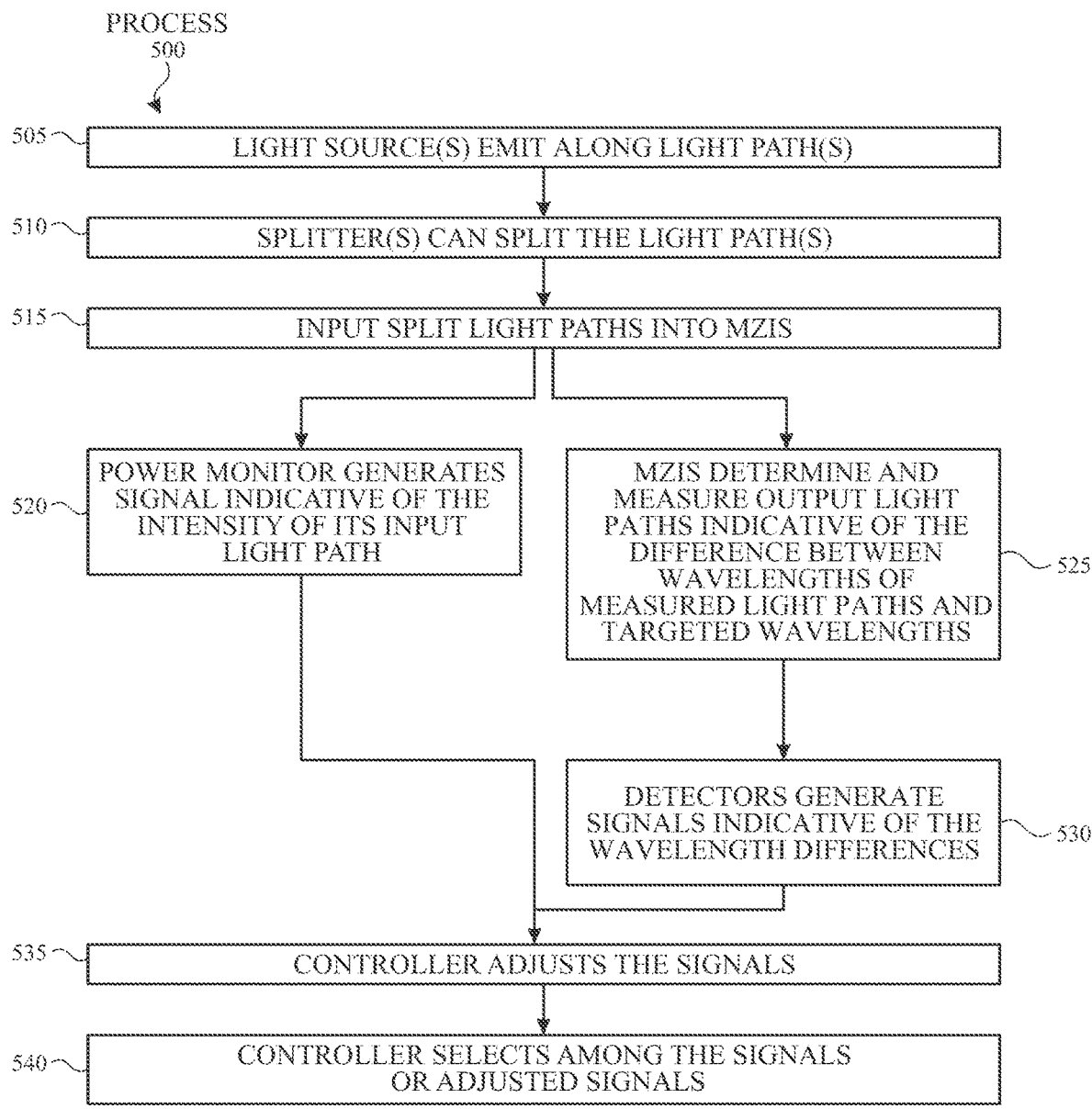
FIG. 5 illustrates an example process flow of the wavelength stability monitor.

FIG. 5 illustrates a process flow of a wavelength stability monitor operation. At operation 505 of process flow 500, light source may emit light along a light path. The light may be received by one or more splitters and at operation 510 the multiple splitters may split the light path into multiple light paths. At operation 515 at least some of the light paths output, from the splitters, such as all light paths but one light path, can be input to the multiple MZIs. At operation 525, the multiple MZIs can receive the light paths output from the splitters and can output light paths indicative of the difference between the wavelength of its input light and the target wavelength. At operation 530, one or more detectors can receive the light paths output from the MZIs and can generate signals indicative of the difference in wavelength. At operation 520, a power monitor can receive at least one light path output from at least one of the splitters and can generate a signal indicative of the intensity of its input light path. A controller (e.g., controller 140 illustrated in FIG. 1) can receive the signals from the detector(s) and the power monitor. At operation 535, the controller can adjust (e.g., take the ratio of) the signals from the detector(s) using the signal from the power monitor.

In some examples and at operation 540, the controller may select at least one of the signals from the detector(s) or the adjusted signals to monitor and lock the wavelength of the light path. The controller may select the signals based on one or more properties, such as slope. For example, the controller may select the signal that has the highest slope for a given target wavelength.

In some examples, the wavelength stability monitor and MZIs may be used to perform wavelength monitoring for multiple wavelengths. For example, the wavelength stability monitoring system can be used to monitor two wavelengths from two light sources. Using a system that monitors two wavelengths from two light sources can result in four unknowns. Four output light paths from, e.g., three MZIs and one power monitor, two MZIs with two outputs each, or etc. can be used to determine the four unknowns. In some applications, the device may be used to measure the average of the wavelengths, rather than measuring separate wavelengths.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Various reference characters are used throughout the description for purposes of referring to one or more elements drawn in the figures. In some instances, a reference character may include numbers followed by a letter. Other reference characters may include the same numbers, but followed by a different letter. The description may refer to the group of elements by referring to the common numbers only, where no letter is appended. In such case, the reference to the group of elements means that the disclosed examples apply to one or more of the group of elements.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A system comprising:
a pair of light sources configured to emit light;
a splitter configured to receive the light emitted by the pair of light source and split the light between a first output light path and a second output light path;
a wavelength monitor configured to receive incoming light along the second output light path and generate a plurality of output signals; and
a controller configured to determine a power weighted average wavelength of the light emitted by the pair of light sources using the plurality of output signals, wherein:
the wavelength monitor comprises:
a set of splitters configured to split the incoming light into a first portion of the incoming light, a second portion of the incoming light, and a third portion of the incoming light;
a first Mach-Zehnder interferometer (MZI) configured to receive the first portion of the incoming light and generate a first output signal of the plurality of output signals;
a second MZI configured to receive the second portion of the incoming light and generate a second output signal of the plurality of output signals; and
a third MZI configured to receive the third portion of the incoming light and generate a third output signal of the plurality of output signals.

2. The system of claim 1, wherein:
the pair of light sources comprises a first light source that is operable to emit a first wavelength of light and a second light source that is operable to emit a second wavelength of light; and
the controller is configured to shift at least one of the first wavelength or the second wavelength using the determined power weighted average wavelength.

3. The system of claim 1, wherein:
the splitter splits the light emitted by the pair of light sources asymmetrically between the first output light path and the second output light path.

4. The system of claim 1, wherein:
each of the plurality of outputs signals has a sinusoidal relationship between wavelength and intensity and a corresponding phase; and
the corresponding phases of the plurality of output signals are different.

5. The system of claim 1, wherein the set of splitters comprises:
a first splitter configured to split the incoming light between a first light path and a second light path;
a second splitter configured to split light received along the first light path between a third light path and a fourth light path; and
a third splitter configured to split light received along the second light path between a fifth light path and a sixth light path, wherein:
the first MZI receives the first portion of the incoming light beam along the third light path;
the second MZI receives the second portion of the incoming light beam along the fourth light path; and
the third MZI receives the third portion of the incoming light beam along the fifth light path.

6. The system of claim 5, wherein the wavelength monitor comprises a power monitor configured to measure an intensity of a fourth portion of the input light received along the sixth light path.

7. The system of claim 1, wherein the wavelength monitor comprises a plurality of photodetectors configured to measure the plurality of output signals.

8. A method comprising:
generating a first wavelength of light with a first light source and a second wavelength of light using a second light source;
splitting, using a splitter, light received by the first light source and the second light source between a first output light path and a second output light path;
splitting, using a set of splitters of a wavelength monitor, incoming light along the second output light path that includes the first wavelength of light and the second wavelength of light into a first portion of the incoming light, a second portion of the incoming light, and a third portion of the incoming light;
generating, using a first Mach-Zehnder interferometer (MZI) of the wavelength monitor, a first output signal of a plurality of output signals from the first portion of the incoming light;
generating, using a second MZI of the wavelength monitor, a second output signal of a plurality of output signals from the second portion of the incoming light;
generating, using a third MZI of the wavelength monitor, a third output signal of a plurality of output signals from the third portion of the incoming light; and
determining a power weighted average wavelength of the first wavelength and the second wavelength using the plurality of output signals.

9. The method of claim 8, wherein determining the power weighted average wavelength using the plurality of outputs signals comprises:
selecting an output signal of the plurality of output signals; and
determining the power weighted average wavelength using the selected output signal.

10. The method of claim 8, comprising:
providing an adjustment signal to the at least one of the first light source or the second light source to shift at least one of the first wavelength or the second wavelength based on the power weighted average wavelength.

11. The method of claim 8, wherein:
each of the plurality of outputs signals has a sinusoidal relationship between wavelength and intensity and a corresponding phase; and
the corresponding phases of the plurality of output signals are different.

* * * * *